US012797734B2

(12) United States Patent
Liu

(10) Patent No.: US 12,797,734 B2
(45) Date of Patent: Nov. 17, 2026

(54) GAME INDICATOR GENERATION USING GRAYSCALE VALUES OF MODEL VERTEXES

(71) Applicant: NETEASE (HANGZHOU) NETWORK CO., LTD., Hangzhou (CN)

(72) Inventor: Yanlong Liu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 71 days.

(21) Appl. No.: 19/122,911

(22) PCT Filed: Jul. 25, 2023

(86) PCT No.: PCT/CN2023/109196
§ 371 (c)(1),
(2) Date: Apr. 21, 2025

(87) PCT Pub. No.: WO2024/082753
PCT Pub. Date: Apr. 25, 2024

(65) Prior Publication Data

US 2026/0166429 A1 Jun. 18, 2026

(30) Foreign Application Priority Data

Oct. 21, 2022 (CN) ......................... 202211295102.1

(51) Int. Cl.
*A63F 13/537* (2014.01)
*G06T 19/20* (2011.01)

(52) U.S. Cl.
CPC ............ *A63F 13/537* (2014.09); *G06T 19/20* (2013.01)

(58) Field of Classification Search
None
See application file for complete search history.

(56) References Cited

U.S. PATENT DOCUMENTS 12,102,916 B2 * 10/2024 Hu ...................... A63F 13/2145
2001/0048435 A1 * 12/2001 Deering .................. G06T 11/10
345/428

(Continued)

FOREIGN PATENT DOCUMENTS

CN 114146412 A 3/2022
CN 114712852 A 7/2022

(Continued)

OTHER PUBLICATIONS

Translation of underlying application for KR 102173546 B1. Downloaded from Global Dossier.*

(Continued)

*Primary Examiner* — Jacob C. Coppola
(74) *Attorney, Agent, or Firm* — Patterson + Sheridan, LLP

(57) ABSTRACT

The present disclosure provides a method for generating a game indicator, including: acquiring a preset fan-shaped indicator model, the fan-shaped indicator model comprising a plurality of model vertexes; performing threshold adjustment on a first grayscale value of each model vertex of the fan-shaped indicator model, and using the adjusted first grayscale value of each model vertex as a fan angle control parameter corresponding to a target fan-shaped indicator; generating a two-dimensional vertex coordinate of a model vertex corresponding to the target fan-shaped indicator based on the fan angle control parameter, a target radius, and a target angle; converting the two-dimensional vertex coordinate into a three-dimensional vertex coordinate; adjusting the three-dimensional vertex coordinate based on a second grayscale value of each model vertex of the fan-shaped indicator model; and generating and displaying the target fan-shaped indicator based on the adjusted three-dimen- (Continued)

sional vertex coordinate, the target angle, and the target radius.

20 Claims, 6 Drawing Sheets

(56) References Cited

U.S. PATENT DOCUMENTS

| | | | | |
|---|---|---|---|---|
| 2003/0058238 | A1* | 3/2003 | Doak | A63F 13/45 709/217 |
| 2005/0243088 | A1* | 11/2005 | Lengyel | G06T 17/20 345/428 |
| 2018/0024660 | A1* | 1/2018 | Wang | G06F 3/04817 273/110 |
| 2020/0143732 | A1* | 5/2020 | Xi | G09G 3/2003 |
| 2022/0047945 | A1* | 2/2022 | Wei | A63F 13/426 |
| 2022/0047946 | A1* | 2/2022 | Hu | A63F 13/2145 |
| 2022/0051470 | A1* | 2/2022 | Wei | A63F 13/2145 |
| 2024/0245991 | A1* | 7/2024 | Chen | A63F 13/55 |
| 2025/0170483 | A1* | 5/2025 | Liu | A63F 13/533 |

FOREIGN PATENT DOCUMENTS

| | | | | | |
|---|---|---|---|---|---|
| CN | 115645921 | A | | 1/2023 | |
| KR | 102173546 | B1 | * | 11/2020 | G06T 13/40 |
| WO | WO-2016198318 | A1 | * | 12/2016 | G06T 15/60 |
| WO | 2023/165315 | A1 | | 9/2023 | |
| WO | 2024/082753 | A1 | | 4/2024 | |

OTHER PUBLICATIONS

International Search Report and Written Opinion received for PCT Patent Application No. PCT/CN2023/109196, mailed on Nov. 11, 2023, 14 pages (7 pages of English Translation and 7 pages of Original Document).

* cited by examiner

Fan-shaped indicator model

GAME INDICATOR GENERATION USING GRAYSCALE VALUES OF MODEL VERTEXES

The present disclosure is a 371 national phase application of PCT Application No. PCT/CN2023/109196 filed Jul. 25, 2023, which claims priority to Chinese Patent Application No. 202211295102.1 filed on Oct. 21, 2022, entitled "GAME INDICATOR GENERATION METHOD AND APPARATUS, COMPUTER DEVICE, AND STORAGE MEDIUM", the entire contents of both of which applications are hereby incorporated by reference for all purposes.

TECHNICAL FIELD

The present disclosure relates to the technical field of games, and specifically relates to a method for generating a game indicator, an apparatus for generating a game indicator, a computer device, and a storage medium.

BACKGROUND

With the continuous development of computer communication technologies and the widespread popularization and application of terminals such as smart phones, tablet computers, and notebook computers, these terminals are developing towards a direction of diversification and personalization, and are increasingly becoming indispensable terminals in users' daily lives and work. In order to meet the growing demand for entertainment and digital experience, games capable of being operated on these terminals have emerged. For example, games such as Multiplayer Online Battle Arena (MOBA) and Massive Multiplayer Online (MMO), which are developed based on client-server architecture, are characterized by high fluency, good gameplay control, and real-time combat features, and have therefore become highly popular among users.

In a MOBA game, a game screen displayed on a graphical user interface of a computer device is usually a picture obtained by observing a virtual environment with a master virtual character as the observation center. A player can control the master virtual character to release a skill in a specified direction, to attack an enemy virtual character in the specified direction. When the player controls the master virtual character to aim at the specified direction, a game indicator usually will be displayed on the game screen to notify the player of the direction in which the skill can be released and of an action range of the skill. According to the related art, the game indicator is usually made by mapping. An indicator angle and an action range corresponding to the game indicator made in this way each remain constant.

SUMMARY

The present disclosure provide a method, system, and apparatus for generating a game indicator, which may solve the problems of relatively rigid and monotonous manifestations of the existing game indicator, cumbersome steps of modifying the indicator angle and action range corresponding to the game indicator, and low fabrication efficiency of the game indicator.

According to a first aspect, the present disclosure provides a method for generating a game indicator, including: acquiring a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex; performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator; generating a two-dimensional vertex coordinate of a model vertex corresponding to the target fan-shaped indicator based on the fan angle control parameter, a target radius, and a target angle determined by the target fan-shaped indicator; converting the two-dimensional vertex coordinate of the model vertex into a three-dimensional vertex coordinate; adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius.

According to a second aspect, the present disclosure further provides a system including one or more memory collectively containing one or more programs, and one or more processors, where the one or more processors are configured to, individually or collectively, perform the operations of one or more steps of the above-mentioned method for generating a game indicator.

According to a third aspect, the present disclosure further provides one or more non-transitory computer-readable storage media containing, in any combination, computer program code that, when executed by a computer system, perform operations of one or more steps of the above-mentioned method for generating a game indicator.

DESCRIPTION OF DRAWINGS

To more clearly describe technical solutions of embodiments of the present disclosure, drawings to be used in the description of the embodiments will be briefly introduced below. Apparently, the drawings described below are merely some embodiments of the present disclosure. For those skilled in the art, other drawings may also be obtained based on these drawings without creative work.

EMBODIMENTS OF THE PRESENT DISCLOSURE

Figure 1:
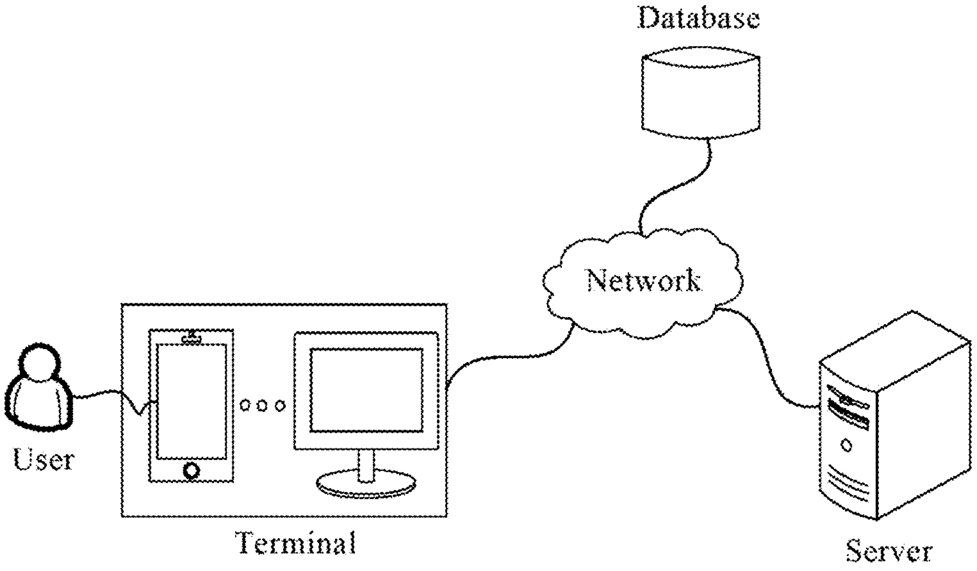
FIG. 1 is a schematic scenario diagram of a system for generating a game indicator provided in one of embodiments of the present disclosure.

Technical solutions of embodiments of the present disclosure will be described clearly and completely below with reference to the drawings in the embodiments of the present disclosure. Apparently, the described embodiments are merely some embodiments, instead of all embodiments, of the present disclosure. All other embodiments obtained by those skilled in the art based on the embodiments of the present disclosure without creative work are encompassed within the scope of protection of the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The embodiments of the present disclosure provide a method for generating a game indicator, an apparatus for generating a game indicator, a computer device, and a storage medium. Specifically, the method for generating a game indicator in an embodiment of the present disclosure can be executed by a computer device, where the computer device may be a device, such as a terminal or a server. The terminal may be a terminal device, such as a smart phone, a tablet computer, a notebook computer, a touch screen, a game machine, a Personal Computer (PC), or a Personal Digital Assistant (PDA). The terminal may further comprise a client. The client may be, e.g., a game application client, a browser client carrying a game program, or an instant messaging client. The server may be a standalone physical server, or may be a server cluster or a distributed system composed of a plurality of physical servers, or may be a cloud server providing basic cloud computing service, such as cloud service, cloud database, cloud computing, cloud function, cloud storage, network service, cloud communication, middleware service, domain name service, security service, CDN, big data, and artificial intelligence platform.

For example, when the method for generating a game indicator runs on the terminal, the terminal device stores a game application program, and is used to present a virtual scenario in a game screen. The terminal device is configured to interact with a user through a graphical user interface, such as downloading, installing, and running the game application program through the terminal device. The terminal device may provide the graphical user interface to the user in a variety of ways, for example, rendering and displaying on a display screen of the terminal device, or presenting the graphical user interface by holographic projection. For example, the terminal device may comprise a touch screen and a processor. The touch screen is configured to present the graphical user interface and receive an operating instruction generated by the user acting on the graphical user interface. The graphical user interface comprises a game screen. The processor is configured to run the game, generate the graphical user interface, respond to the operating instruction, and control the display of the graphical user interface on the touch screen.

For example, when running on the server, the method for generating a game indicator may be a cloud game. The cloud game refers to a gaming method based on cloud computing. In an operating mode of the cloud game, an entity for running the game application program is separated from an entity for presenting the game screen, and the storage and running of the method for generating a game indicator are completed on a cloud game server. The game screen presentation is completed on a cloud game client. The cloud game client is mainly configured to receive and transmit game data and present the game screen. For example, the cloud game client may be a display device that is close to a user side and has a data transmission function, such as a mobile terminal, a television set, a computer, a handheld computer, or a personal digital assistant, but the terminal device that performs game data processing is a cloud game server in cloud. When playing a game, the user operates the cloud game client to transmit the operating instruction to the cloud game server. The cloud game server runs the game based on the operating instruction, encodes and compresses the data such as the game screen, and returns the encoded and compressed data to the cloud game client through a network. Finally, the cloud game client decodes the encoded and compressed data, and outputs the game screen.

The embodiments of the present disclosure provide a method, system, and apparatus for generating a game indicator, which construct a three-dimensional vertex coordinate for each model vertex based on a preset fan-shaped indicator model, and allow parameters such as a fan radius and a preset angle of the three-dimensional vertex coordinate to be adjusted, so as to dynamically modify a target fan-shaped indicator corresponding to the preset fan-shaped indicator model, and obtain a fan-shaped indicator with an action range controllable in real time. The disclosed approach diversifies the virtual representation of the fan-shaped indicator, simplifies the steps of modifying an indicator angle and an action range corresponding to the game indicator, and improves the fabrication efficiency of the game indicator.

Referring to FIG. 1, FIG. 1 is a schematic scenario diagram of a system for generating a game indicator provided in an embodiment of the present disclosure. The system may comprise at least one terminal, at least one server, at least one database, and a network. A terminal held by a user may be connected to servers of different games through the network. The terminal is any device with computing hardware capable of supporting and executing a software product corresponding to a game. In addition, when the system comprises a plurality of terminals, a plurality of servers, and a plurality of networks, different terminals may be connected to each other through different networks and different servers. The network may be a wireless network or a wired network. For example, the wireless network may be a wireless local area network (WLAN), a local area network (LAN), a cellular network, a 2G network, a 3G network, a 4G network, a 5G network, etc. In addition, different terminals may also be connected to other terminals or connected to servers using their own Bluetooth networks or hotspot networks. For example, a plurality of users may be online via different terminals, so that they are connected through appropriate networks and synchronized with each other, to support multi-player games. In addition, the system may comprise a plurality of databases coupled to different servers, and may continuously store information related to the game environment in the databases when different users are playing multi-player games online.

It should be noted that the schematic scenario diagram of the system for generating a game indicator shown in FIG. 1 is merely an example. The system for generating a game indicator and the scenario are described in the embodiments of the present disclosure to more clearly illustrate the technical solutions of the embodiments of the present disclosure, and do not impose any limitation on the technical solutions provided in the embodiments of the present disclosure. As appreciated by those of ordinary skills in the art, with the emergence of new service scenarios, the technical solutions provided in the embodiments of the present disclosure are also adapted to similar technical problems.

Based on the above problems, the embodiments of the present disclosure provide a method for generating a game indicator, an apparatus for generating a game indicator, a computer device, and a storage medium, which can improve the fabrication efficiency of the game indicator. The detailed description will be provided below respectively. It should be noted that the order of description of the embodiments below does not impose any limitation on a preferred order of the embodiments.

Figure 2:
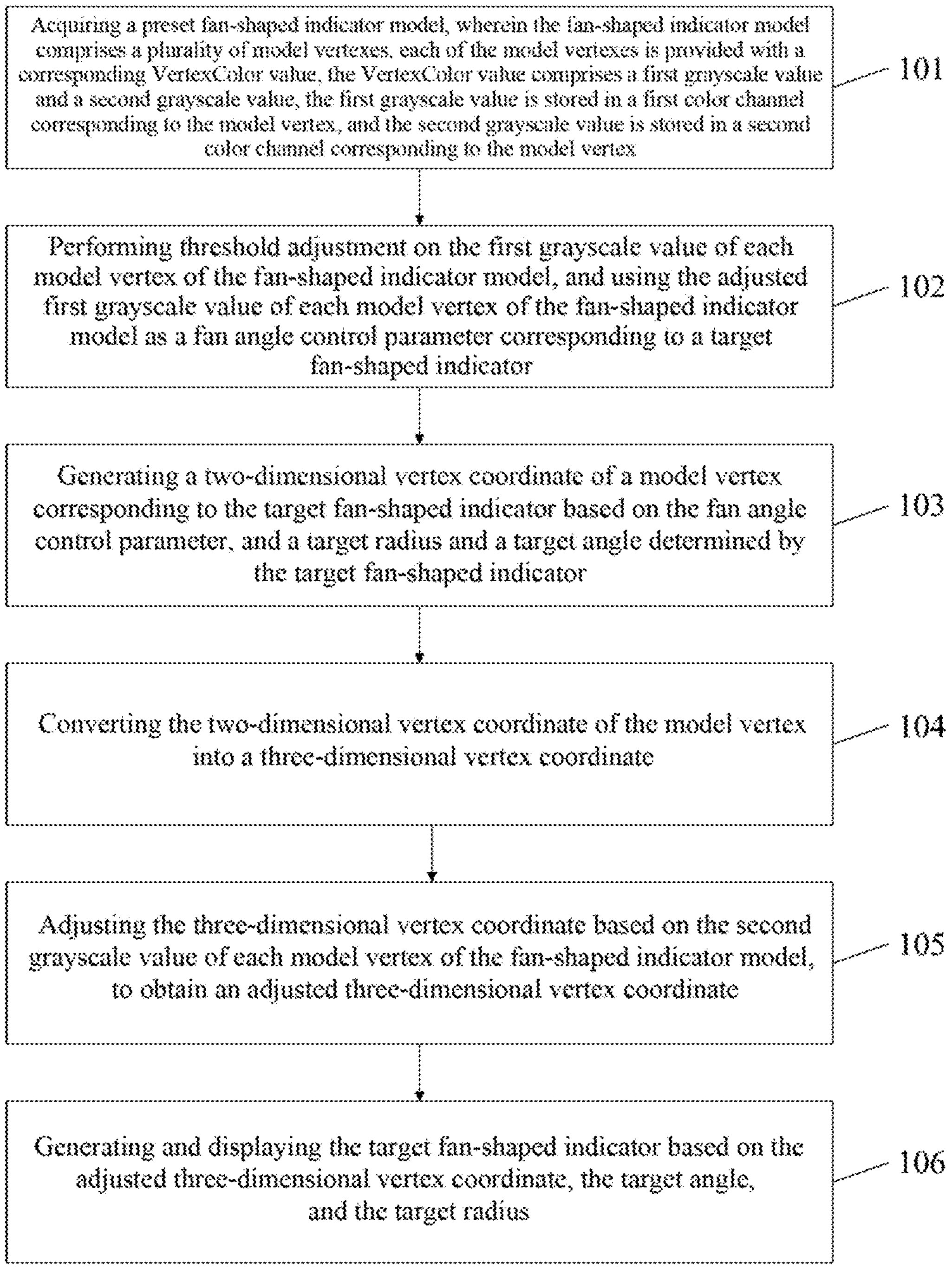
FIG. 2 is a schematic flowchart of a method for generating a game indicator provided in one of embodiments of the present disclosure.

Referring to FIG. 2, FIG. 2 is a schematic flowchart of a method for generating a game indicator provided in an embodiment of the present disclosure. Specific processes of the method for generating a game indicator may be steps 101 to 106 as below:

101: acquiring a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex.

Figure 3:
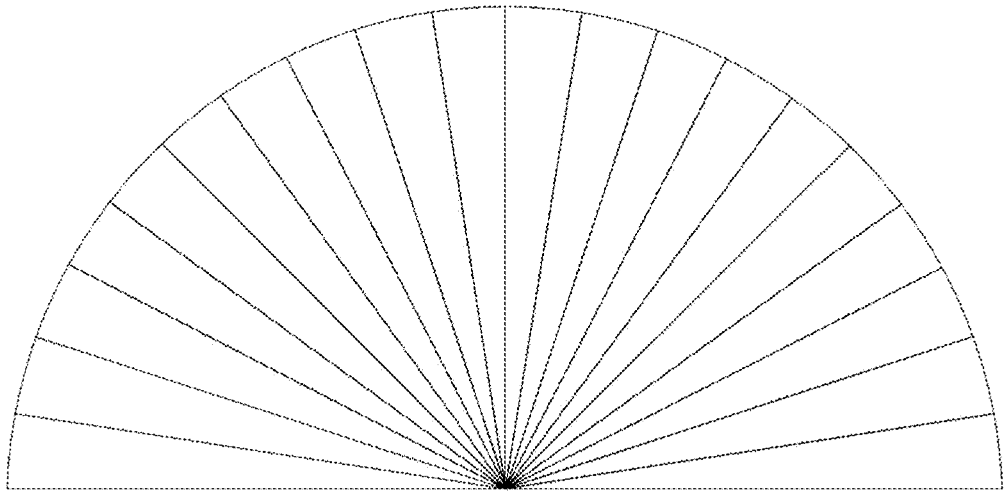
FIG. 3 is a schematic structural diagram of a fan-shaped indicator model provided in one of embodiments of the present disclosure.

In an embodiment of the present disclosure, referring to FIG. 3, an artist can create a fan-shaped indicator model in a model space using 3D software, and plot a VertexColor corresponding to each model vertex. The VertexColor comprises a first grayscale value and a second grayscale value. The fan-shaped indicator model also exists in a world space. The model space is a three-dimensional space constructed from the origin of a virtual model itself. The world space can be understood as a three-dimensional space shared by all virtual models. The VertexColor is the color of each vertex on the virtual model. Generally, four channels are available, namely channels RGBA. The value range of each channel is between 0 and 1, where 0 is visually understood as black, and 1 is visually understood as white. Specifically, in an embodiment of the present disclosure, the channel A may be selected to store the first grayscale value, and the channel R may be selected to store the second grayscale value. It is understandable that the G may be selected to store the first grayscale value, and the B may be selected to store the second grayscale value. In some embodiments, any two channels among the channels RGBA may be selected to store the first grayscale value and the second grayscale value. The value range of the first grayscale value and the second grayscale value is [0,1], where 0 represents black, and 1 represents white.

Figure 4:
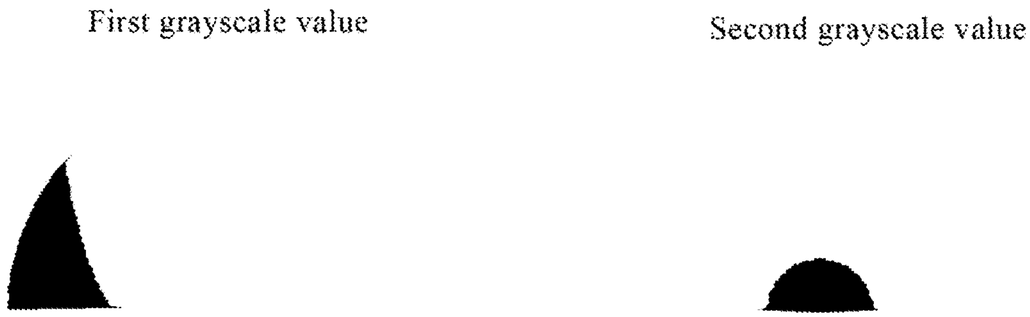
FIG. 4 is a schematic color diagram of each model vertex of a fan-shaped indicator model provided in one of embodiments of the present disclosure.

Referring to FIG. 4, FIG. 4 is a schematic color diagram of each model vertex of a fan-shaped indicator model, and is used to intuitively reflect color manifestations of the first grayscale value and the second grayscale value of each model vertex of the fan-shaped indicator model. The setting rule of VertexColor.a (first grayscale value) of each model vertex is that first grayscale values of model vertexes from left to right are set in an ascending order, so that the first grayscale value can be used as a fan angle control parameter, and so that the value stored in the channel A plays a role in constructing a positive-negative relationship between model vertex coordinates. In addition, the setting rule of VertexColor.r (second grayscale value) of each model vertex is that second grayscale values of the model vertexes from the center model vertex to surrounding model vertexes are set in an ascending order, so that the second grayscale value can be used as the fan radius control parameter, and so that the value stored in the channel R plays a role in constraining the vertex range of the model vertex coordinates.

In an embodiment of the present disclosure, the preset fan-shaped indicator model and the target fan indicator obtained by adjusting the preset fan-shaped indicator model are each a grid model with a thickness parameter of zero.

102: performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator.

In order to meet the standard for subsequent coordinate establishment, the step "performing threshold adjustment on the first grayscale value of each model vertex of the fan-shaped indicator model, and using the adjusted first grayscale value of each model vertex of the fan-shaped indicator model as the fan angle control parameter corresponding to the target fan-shaped indicator" may comprise:

mapping, by specifying an offset parameter value and adjusting a weight value, the first grayscale value of each model vertex of the fan-shaped indicator model from an initial threshold range into a target threshold range.

In a specific embodiment, the step "mapping, by specifying the offset parameter value and adjusting the weight value, the first grayscale value of each model vertex of the fan-shaped indicator model from the initial threshold range into the target threshold range" may comprise:

acquiring a difference value between the first grayscale value of each model vertex and the specified offset parameter value; and acquiring a product of the difference value of each model vertex and the adjusted weight value, and using the product of each model vertex as the fan angle control parameter of each model vertex.

The specified offset parameter value and the adjusted weight value provided in an embodiment of the present disclosure are set by an artist, to map the first grayscale value of each model vertex of the fan-shaped indicator model from the initial threshold range into the target threshold range.

In order to adjust the first grayscale value of the fan-shaped indicator model to a correct result following the x-axis and the y-axis of a coordinate system, parameter 0.5 is used as the specified offset parameter value, and parameter 2 is used as the adjusted weight value, thereby adjusting the first grayscale value of each model vertex, and mapping the first grayscale value of each model vertex of the fan-shaped indicator model from the initial threshold range into the target threshold range. For example, when the initial threshold range of the first grayscale value of each model vertex of the fan-shaped indicator model is [0,1], the artist may set the target threshold range to [−1,1], and may convert the first grayscale value of each model vertex using a threshold adjustment formula $VertexColor.a_2=(VertexColor.a_1-0.5)*2$, thereby obtaining the adjusted first grayscale value of each model vertex as the fan angle control parameter, where the $VertexColor.a_1$ is an initial first grayscale value of each model vertex, and the $VertexColor.a_2$ is the adjusted first grayscale value of each model vertex.

103: generating a two-dimensional vertex coordinate of a model vertex corresponding to the target fan-shaped indicator based on the fan angle control parameter, and a target radius and a target angle determined by the target fan-shaped indicator.

For example, the center point of the target fan-shaped indicator model may be placed at the origin of a two-dimensional coordinate system. The radius of the target fan-shaped indicator model is r. A point a1 on the target fan-shaped indicator model is taken, and an angle between a straight line from the point a1 to the origin and the y-axis is A/2, so that the position coordinate of a point a on the target fan-shaped indicator model in the first and fourth quadrants can be calculated following a trigonometric function formula, specifically, a1(x,y)=a(sin(A/2)*r, cos(A/2)*r), and a coordinate point a2 symmetrical to the point a1 on the target fan-shaped indicator model is a1(−x,y)=a(−sin(A/2)*r, cos(A/2)*r). Further, the above-obtained two-dimensional coordinate formula is multiplied by the fan angle control parameter of each model vertex, to derive position coordinates N of all model vertexes on all line segments (fan arcs and other edge contour lines except for the fan arcs) constituting the target fan-shaped indicator model, specifically, N(x,y)=N(sin((A/2)*vc.a)*r,cos((A/2)*vc.a)*r), where vc.a is the fan angle control parameter of each model vertex.

In an embodiment of the present disclosure, before the step "generating the two-dimensional vertex coordinate of the model vertex corresponding to the target fan-shaped indicator based on the fan angle control parameter, and the target radius and the target angle determined by the target fan-shaped indicator", the method may comprise:

initializing a vertex coordinate corresponding to each model vertex among the plurality of model vertexes to set the vertex coordinate to zero.

104: converting the two-dimensional vertex coordinate of the model vertex into a three-dimensional vertex coordinate.

Specifically, the step "converting the two-dimensional vertex coordinate of the model vertex into the three-dimensional vertex coordinate" may comprise:

determining, based on a position relationship between the fan-shaped indicator model and a preset coordinate system, a target coordinate axis in a vertical relationship with the fan-shaped indicator model in the preset coordinate system;

setting a coordinate value of each model vertex on the target coordinate axis to zero; and determining the three-dimensional vertex coordinate of each model vertex based on the two-dimensional vertex coordinate of each model vertex and the coordinate value.

For example, the artist needs to make a corresponding conversion based on an actual position of the fan-shaped indicator model in a three-dimensional space. It is known that the fan-shaped indicator model has no thickness, so that an axial vertex coordinate perpendicular to the plane of the fan-shaped indicator model is 0. Therefore, the coordinate of N can be derived, specifically, N(x,0,z)=N(sin((A/2)*vc.a)*r,0,cos((A/2)*vc.a)*r). In some embodiments, if the artist needs to design a fan-shaped indicator model with a thickness based on design requirements, the coordinate value of each model vertex on the target coordinate axis may be set to a non-zero value.

105: adjusting the three-dimensional vertex coordinate based on the second grayscale value of each model vertex of the fan-shaped indicator model, to obtain an adjusted three-dimensional vertex coordinate.

In a specific embodiment, the step "adjusting the three-dimensional vertex coordinate based on the second grayscale value of each model vertex of the fan-shaped indicator model, to obtain the adjusted three-dimensional vertex coordinate" may comprise:

multiplying the second grayscale value of each model vertex by the corresponding three-dimensional vertex coordinate thereof, to obtain the adjusted three-dimensional vertex coordinate of each model vertex.

Since the center point of the fan-shaped indicator model will remain constant when the angle and radius of the fan-shaped indicator model are adjusted, in order to ensure that the center point position of the fan is always (0,0,0), it is necessary to multiply the coordinate of N by the second grayscale value of the VertexColor of the model vertex stored in the channel R to ensure that the center point position of the fan is always (0,0,0), thereby ensuring that the center point remains constant. The computing formula of the coordinate of N is: N(x,0,z)=N(sin((A/2)*vc.a)*r, 0,cos((A/2)*vc.a)*r). The coordinate of N is multiplied by the second grayscale value of the VertexColor of each model vertex stored in the channel R, to obtain the final formula of:

$$N(x, 0, z) = N\left(\sin\left(\left(A/2\right)*vc\cdot a\right)*r*vc\cdot r,\ 0,\ \cos\left(\left(A/2\right)*vc\cdot a\right)*r*vc\cdot r\right).$$

106: generating and displaying the target fan-shaped indicator based on the adjusted three-dimensional vertex coordinate, the target angle, and the target radius.

Specifically, after the step "generating and displaying the target fan-shaped indicator based on the adjusted three-dimensional vertex coordinate, the target angle, and the target radius", the method may comprise:

- acquiring, in response to an adjustment instruction for the target fan-shaped indicator, a fan-shaped model adjustment parameter, where the fan-shaped model adjustment parameter comprises an angle adjustment parameter and/or a radius adjustment parameter;
- adjusting the adjusted three-dimensional vertex coordinate of each model vertex in the target fan-shaped indicator based on the fan-shaped model adjustment parameter, to obtain a target three-dimensional vertex coordinate of each model vertex; and
- updating the target fan-shaped indicator based on the target three-dimensional vertex coordinate of each model vertex, and generating and displaying the updated target fan-shaped indicator.

Further, the step "adjusting the adjusted three-dimensional vertex coordinate of each model vertex in the target fan-shaped indicator based on the fan-shaped model adjustment parameter, to obtain the target three-dimensional vertex coordinate of each model vertex" may include:

- replacing a target angle and/or a target radius of the adjusted three-dimensional vertex coordinate of each model vertex in the target fan-shaped indicator based on the angle adjustment parameter and/or the radius adjustment parameter, to obtain the target three-dimensional vertex coordinate of each model vertex.

In an embodiment of the present disclosure, a player can control a master virtual character to release a skill in a specified direction, to attack an enemy virtual character in the specified direction. When the player controls the master virtual character to aim at the specified direction, the target fan-shaped indicator usually will be displayed on the game screen to notify the player of the direction in which a game skill triggered by a master virtual character currently controlled by the player can be released and of an action range of the game skill. Or, the master virtual character controlled by the player can perform a chase or capture operation on other virtual characters controlled by other players. When it is detected that the master virtual character is playing a game round with other virtual characters, the target fan-shaped indicator is generated in front of the master virtual character based on the real-time display position of the master virtual character as the field of view for capture. Once other virtual characters enter the fan-shaped region of the target fan-shaped indicator, they will be discovered, and then locked and hunted by the master virtual character. Further, during the game, the master virtual character can increase the radius and angle of the target fan-shaped indicator by upgrade or by addition of a virtual item, thereby increasing the range of the fan-shaped region of the target fan-shaped indicator.

In order to further illustrate the method for generating a game indicator provided in an embodiment of the present disclosure, the description will be provided below with the application of the method for generating a fan-shaped indicator model in a specific implementation scenario as an example. The specific application scenario is as follows:

- the artist can create a fan-shaped indicator model in a model space using 3D software, and plot a VertexColor corresponding to each model vertex, where the VertexColor comprises the first grayscale value and the second grayscale value. In an embodiment of the present disclosure, the channel A may be selected to store the first grayscale value, and the channel R may be selected to store the second grayscale value, where the value range of the first grayscale value and the second grayscale value is [0,1], where 0 represents black, and 1 represents white. The setting rule of VertexColor.a (first grayscale value) of each model vertex is that first grayscale values of model vertexes from left to right are set in an ascending order, so that the first grayscale value can be used as a fan angle control parameter, and so that the value stored in the channel A plays a role in constructing a positive-negative relationship between model vertex coordinates. In addition, the setting rule of VertexColor.r (second grayscale value) of each model vertex is that second grayscale values of the model vertexes from the center model vertex to surrounding model vertexes are set in an ascending order, so that the second grayscale value can be used as the fan radius control parameter, and so that the value stored in the channel R plays a role in constraining the vertex range of the model vertex coordinates.

Figure 5:
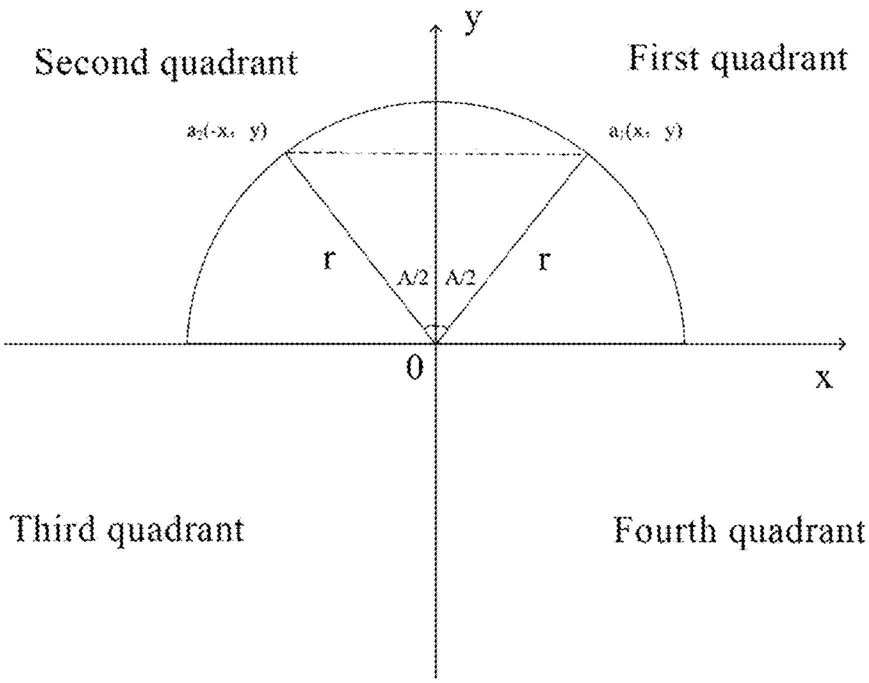
FIG. 5 is a schematic scenario diagram of a fan-shaped indicator model provided in one of embodiments of the present disclosure.
Figure 6:
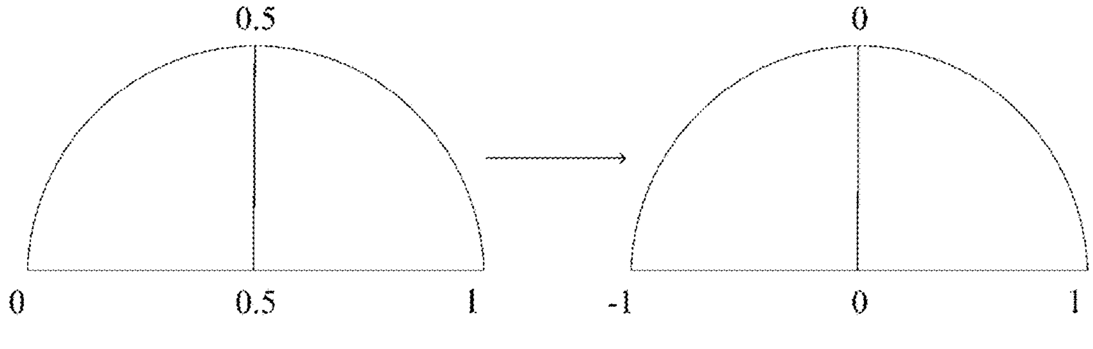
FIG. 6 is a schematic scenario diagram of a VertexColor threshold of a fan-shaped indicator model provided in one of embodiments of the present disclosure.

Referring to FIG. 5, the center point of the fan-shaped indicator model may be placed at the origin of a two-dimensional coordinate system. The radius of the fan-shaped indicator model is r. A point $a_1$ on the fan-shaped indicator model is taken, and an angle between a straight line from the point $a_1$ to the origin and the y-axis is A/2, so that the position coordinate of a point a on the fan-shaped indicator model in the first and fourth quadrants can be calculated following a trigonometric function formula, specifically, $a_1(x,y)=a(\sin(A/2)*r, \cos(A/2)*r)$, and a coordinate point $a_2$ symmetrical to the point $a_1$ on the fan-shaped indicator model is $a_1(-x,y)=a(-\sin(A/2)*r, \cos(A/2)*r)$. Further, referring to FIG. 6, when the initial threshold range of the first grayscale value of each model vertex of the fan-shaped indicator model is [0,1], the artist may set the target threshold range to [−1,1], use parameter 0.5 as the specified offset parameter value, use parameter 2 as the adjusted weighted value, and convert the first grayscale vertex a value of each model using threshold adjustment formula $VertexColor.a_2-(VertexColor.a_1-0.5)*2$, thereby obtaining the adjusted first grayscale value of each model vertex as the fan angle control parameter, where the $VertexColor.a_1$ is an initial first grayscale value of each model vertex, and the $VertexColor.a_2$ is the adjusted first grayscale value of each model vertex.

Further, the artist can multiply the above-obtained two-dimensional coordinate formula by the fan angle control parameter of each model vertex, to derive the position coordinates N of all vertexes on the fan arc of the fan-shaped indicator model, specifically, $N(x,y)=N(\sin((A/2)*vc.a)*r, \cos((A/2)*vc.a)*r)$, where vc.a is the fan angle control parameter of each model vertex.

Figure 7:
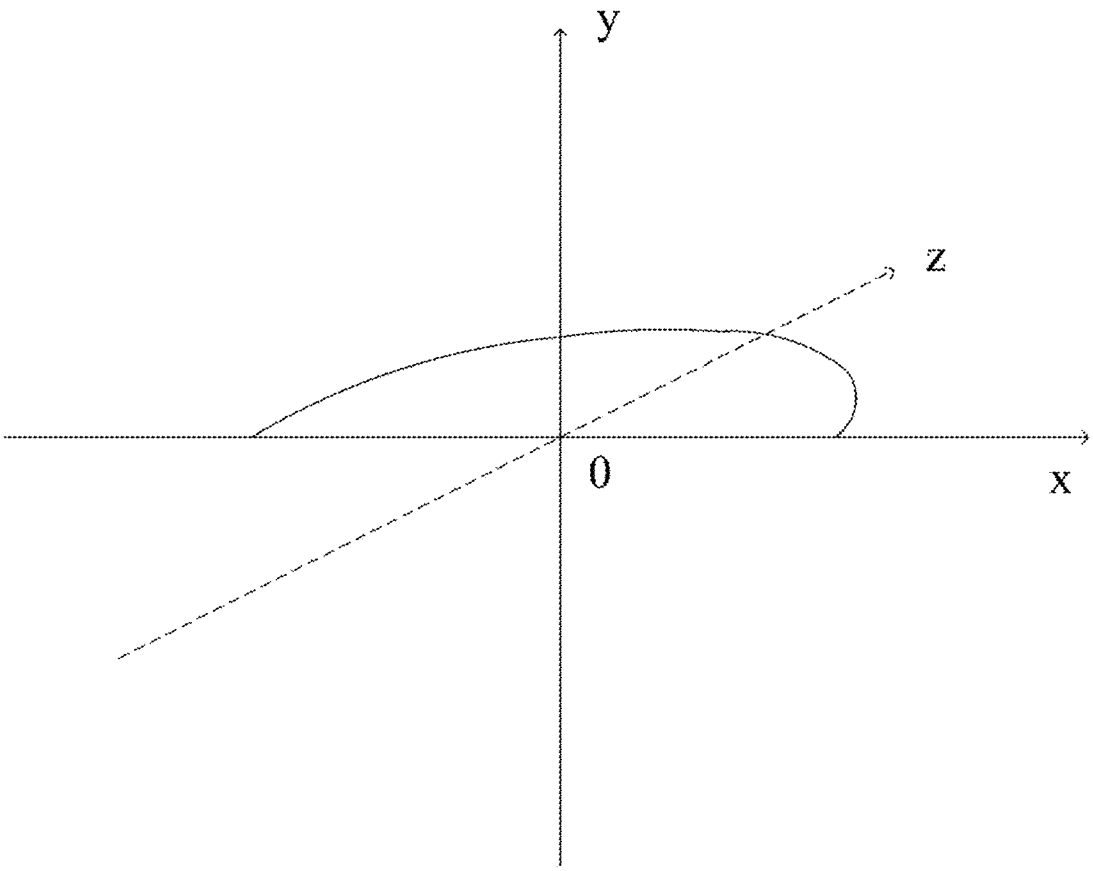
FIG. 7 is another schematic scenario diagram of a fan-shaped indicator model provided in one of embodiments of the present disclosure.

Referring to FIG. 7, in an embodiment of the present disclosure, the artist needs to make a corresponding conversion based on an actual position of the fan-shaped indicator model in a three-dimensional space. It is known that the fan-shaped indicator model has no thickness, so that an axial vertex coordinate perpendicular to the plane of the fan-shaped indicator model is 0. Therefore, the coordinate of N can be derived, specifically, $N(x,0,z)=N(\sin((A/2)*vc.a)*r, 0, \cos((A/2)*vc.a)*r)$. In addition, the center point of the fan-shaped indicator model will remain constant when the angle and radius of the fan-shaped indicator model are changed, and in order to ensure that the center point position of the fan is always (0,0,0), the artist further needs to multiply the coordinate of N by the channel R of the VertexColor to ensure that the center point position of the fan is always (0,0,0), specifically, the final coordinate computing formula is $N_{final}(x,0,z)=N(\sin((A/2)*vc.a)*r*vc.r,0,\cos((A/2)*vc.a)*r*vc.r)$.

In order to avoid a position deviation caused by a vertex position of the fan-shaped indicator model itself, during the model output, the model needs to be zoomed to the origin position, add the above-derived $N_{final}$ coordinate position and the vertex position of the fan-shaped indicator model in the model space, and then turn to a world space to continue subsequent screen plotting, thereby displaying a fan-shaped indicator corresponding to the fan-shaped indicator model on the screen.

In order to further illustrate the method for generating a game indicator provided in an embodiment of the present disclosure, the description will be provided below with the application of a method for processing a target fan-shaped indicator in a specific implementation scenario as an example. The specific application scenario is as follows:

a computer device can acquire the target radius and the target angle corresponding to the target fan-shaped indicator finally required by the artist, and substitute the target radius and the target angle into a computing formula of each model vertex corresponding to the preset fan-shaped indicator model, the computing formula of the model vertex being: $N_{final}(x,0,z)=N(\sin((A/2)*vc.a)*r*vc.r, 0, \cos((A/2)*vc.a)*r*vc.r)$, thereby obtaining the vertex coordinate of each model vertex corresponding to the target fan-shaped indicator, and generating and displaying the target fan-shaped indicator based on the vertex coordinate.

The computer device can acquire a fan-shaped model adjustment parameter set by the artist. The computer device can acquire, in response to an adjustment instruction for the target fan-shaped indicator, the fan-shaped model adjustment parameter, where the fan-shaped model adjustment parameter comprises an angle adjustment parameter and/or a radius adjustment parameter; adjust the adjusted three-dimensional vertex coordinate of each model vertex in the target fan-shaped indicator based on the fan-shaped model adjustment parameter, to obtain a target three-dimensional vertex coordinate of each model vertex; and update the target fan-shaped indicator based on the target three-dimensional vertex coordinate of each model vertex, and generate and display the updated target fan-shaped indicator. Specifically, the computer device can replace the target angle and/or the target radius of the adjusted three-dimensional vertex coordinate of each model vertex in the target fan-shaped indicator based on the angle adjustment parameter and/or the radius adjustment parameter, to obtain the target three-dimensional vertex coordinate of each model vertex, and generate and display the adjusted target fan-shaped indicator based on the target three-dimensional vertex coordinate.

In summary, the embodiments of the present disclosure provide a method for generating a game indicator, comprising acquiring a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex; performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator; generating a two-dimensional vertex coordinate of a model vertex corresponding to the target fan-shaped indicator based on the fan angle control parameter, and a target radius and a target angle determined by the target fan-shaped indicator; converting the two-dimensional vertex coordinate of the model vertex into a three-dimensional vertex coordinate; adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius. In the embodiments of the present disclosure, the three-dimensional vertex coordinate of each model vertex is constructed based on the preset fan-shaped indicator model, and the parameters such as the fan radius and the preset angle of the three-dimensional vertex coordinate can be changed, to dynamically adjust the target fan-shaped indicator corresponding to the preset fan-shaped indicator model, and obtain a fan-shaped indicator with the action range controllable in real time, thereby diversifying the manifestations of the fan-shaped indicator, simplifying the steps of modifying the indicator angle and the action range corresponding to the game indicator, and improving the fabrication efficiency of the game indicator.

In order to facilitate better implementation of the method for generating a game indicator provided in the embodiments of the present disclosure, an embodiment of the present disclosure further provides an apparatus for generating a game indicator based on the above method for generating a game indicator. Meanings of the terms are same as those in the above method for generating a game indicator. The description in the method embodiments may be referred to for specific implementation details.

Figure 8:
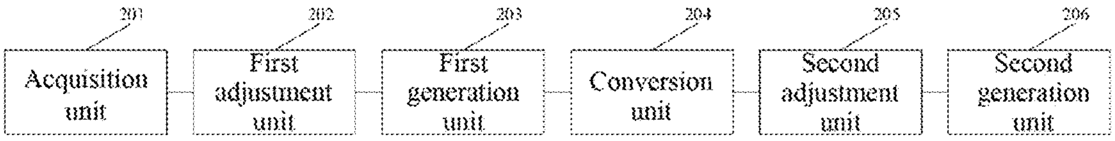
FIG. 8 is a schematic structural diagram of an apparatus for generating a game indicator provided in one of embodiments of the present disclosure.

Referring to FIG. 8, FIG. 8 is a schematic structural diagram of an apparatus for generating a game indicator provided in an embodiment of the present disclosure. The apparatus comprises:

an acquisition unit 201 configured to acquire a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;

a first adjustment unit 202 configured to perform threshold adjustment on the first grayscale value of each model vertex of the fan-shaped indicator model, and use the adjusted first grayscale value of each model vertex of the fan-shaped indicator model as a fan angle control parameter corresponding to a target fan-shaped indicator;

a first generation unit 203 configured to generate a two-dimensional vertex coordinate of a model vertex corresponding to the target fan-shaped indicator based on the fan angle control parameter, the target radius, and the target angle;

a conversion unit 204 configured to convert the two-dimensional vertex coordinate of the model vertex into a three-dimensional vertex coordinate;

a second adjustment unit 205 configured to adjust the three-dimensional vertex coordinate based on the second grayscale value of each model vertex of the fan-shaped indicator model, to obtain an adjusted three-dimensional vertex coordinate; and a second generation unit 206 configured to generate and display the target fan-shaped indicator based on the adjusted three-dimensional vertex coordinate, the target angle, and the target radius.

In some embodiments, the apparatus for generating a game indicator comprises:

a first processing subunit configured to initialize a vertex coordinate corresponding to each model vertex among the plurality of model vertexes to set the vertex coordinate to zero.

In some embodiments, the apparatus for generating a game indicator comprises:

a first acquisition subunit configured to acquire, in response to an adjustment instruction for the target fan-shaped indicator, a fan-shaped model adjustment parameter, where the fan-shaped model adjustment parameter comprises an angle adjustment parameter and/or a radius adjustment parameter;

an adjustment subunit configured to adjust the adjusted three-dimensional vertex coordinate of each model vertex in the target fan-shaped indicator based on the fan-shaped model adjustment parameter, to obtain a target three-dimensional vertex coordinate of each model vertex; and an update subunit configured to update the target fan-shaped indicator based on the target three-dimensional vertex coordinate of each model vertex, and generate and display the updated target fan-shaped indicator.

In some embodiments, the apparatus for generating a game indicator comprises:

a replacement subunit configured to replace a target angle and/or a target radius of the adjusted three-dimensional vertex coordinate of each model vertex in the target fan-shaped indicator based on the angle adjustment parameter and/or the radius adjustment parameter, to obtain the target three-dimensional vertex coordinate of each model vertex.

In some embodiments, the apparatus for generating a game indicator comprises:

a mapping subunit configured to map, by specifying an offset parameter value and adjusting a weight value, the first grayscale value of each model vertex of the fan-shaped indicator model from an initial threshold range into a target threshold range.

In some embodiments, the apparatus for generating a game indicator comprises:

a second acquisition subunit configured to acquire a difference value between the first grayscale value of each model vertex and the specified offset parameter value;

the second acquisition subunit being further configured to acquire a product of the difference value of each model vertex and the adjusted weight value, and use the product of each model vertex as the fan angle control parameter of each model vertex.

In some embodiments, the apparatus for generating a game indicator comprises:

a determination subunit configured to determine, based on a position relationship between the fan-shaped indicator model and a preset coordinate system, a target coordinate axis in a vertical relationship with the fan-shaped indicator model in the preset coordinate system; and a setting subunit configured to set a coordinate value of each model vertex on the target coordinate axis to zero;

the determination subunit being further configured to determine the three-dimensional vertex coordinate of each model vertex based on the two-dimensional vertex coordinate of each model vertex and the coordinate value.

In some embodiments, the apparatus for generating a game indicator comprises:

a second processing subunit configured to multiply the second grayscale value of each model vertex by the corresponding three-dimensional vertex coordinate thereof, to obtain the adjusted three-dimensional vertex coordinate of each model vertex.

The embodiments of the present disclosure provide an apparatus for generating a game indicator, comprising an acquisition unit 201 configured to acquire a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex; a first adjustment unit 202 configured to perform threshold adjustment on the first grayscale value of each model vertex of the fan-shaped indicator model, and use the adjusted first grayscale value of each model vertex of the fan-shaped indicator model as a fan angle control parameter corresponding to a target fan-shaped indicator; a first generation unit 203 configured to generate a two-dimensional vertex coordinate of a model vertex corresponding to the target fan-shaped indicator based on the fan angle control parameter, the target radius, and the target angle; a conversion unit 204 configured to convert the two-dimensional vertex coordinate of the model vertex into a three-dimensional vertex coordinate; a second adjustment unit 205 configured to adjust the three-dimensional vertex coordinate based on the second grayscale value of each model vertex of the fan-shaped indicator model, to obtain an adjusted three-dimensional vertex coordinate; and a second generation unit 206 configured to generate and display the target fan-shaped indicator based on the adjusted three-dimensional vertex coordinate, the target angle, and the target radius. In the embodiments of the present disclosure, the three-dimensional vertex coordinate of each model vertex is constructed based on the preset fan-shaped indicator model, and the parameters such as the fan radius and the preset angle of the three-dimensional vertex coordinate can be changed, to dynamically adjust the target fan-shaped indicator corresponding to the preset fan-shaped indicator model, and obtain a fan-shaped indicator with the action range controllable in real time, thereby diversifying the manifestations of the fan-shaped indicator, simplifying the steps of modifying the indicator angle and the action range corresponding to the game indicator, and improving the fabrication efficiency of the game indicator.

Figure 9:
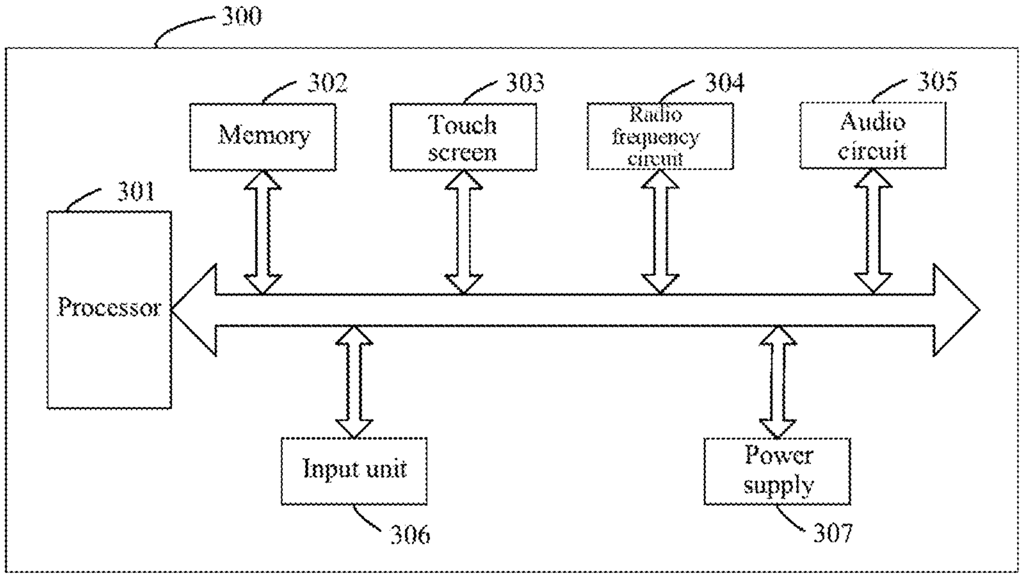
FIG. 9 is a schematic structural diagram of a computer device provided in one of embodiments of the present disclosure.

Accordingly, an embodiment of the present disclosure further provides a computer device. The computer device may be a terminal or a server. The terminal may be a terminal device, such as a smart phone, a tablet computer, a notebook computer, a touch screen, a game machine, a Personal Computer (PC), or a Personal Digital Assistant (PDA). As shown in FIG. 9, FIG. 9 is a schematic structural diagram of a computer device provided in an embodiment of the present disclosure. The computer device 300 comprises a processor 301 having one or more than one processing core, a memory 302 having one or more than one computer-readable storage medium, and a computer program stored on the memory 302 and runnable on the processor. The processor 301 is electrically connected to the memory 302. Those skilled in the art can understand that the structure of the computer device shown in the figure does not constitute any limitation to the computer device, and may comprise more or fewer components than those shown in the figure, or may combine some components, or may have different component arrangements.

The processor 301 is a control center of the computer device 300, connects various parts of the entire computer device 300 using various interfaces and wires, implements various functions of the computer device 300 by running or loading software programs and/or modules stored in the memory 302, and implements data processing by invoking data stored in the memory 302, thereby performing overall monitoring on the computer device 300.

In an embodiment of the present disclosure, the processor 301 in the computer device 300 will load instructions corresponding to processes of one or more than one application program into the memory 302 following the steps below, and the processor 301 runs the application program stored in the memory 302, thereby implementing various functions:

acquiring a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;

performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator;

generating a two-dimensional vertex coordinate of a model vertex corresponding to the target fan-shaped indicator based on the fan angle control parameter, and a target radius and a target angle determined by the target fan-shaped indicator;

converting the two-dimensional vertex coordinate of the model vertex into a three-dimensional vertex coordinate;

adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius.

In an embodiment, before the generating the two-dimensional vertex coordinate of the model vertex corresponding to the target fan-shaped indicator based on the fan angle control parameter, and the target radius and the target angle determined by the target fan-shaped indicator, the implementation further comprises:

initializing a vertex coordinate corresponding to each model vertex among the plurality of model vertexes to set the vertex coordinate to zero.

In an embodiment, after the generating and displaying the target fan-shaped indicator based on the adjusted three-dimensional vertex coordinate, the target angle, and the target radius, the implementation further comprises:

acquiring, in response to an adjustment instruction for the target fan-shaped indicator, a fan-shaped model adjustment parameter, where the fan-shaped model adjustment parameter comprises an angle adjustment parameter and/or a radius adjustment parameter;

adjusting the adjusted three-dimensional vertex coordinate of each model vertex in the target fan-shaped indicator based on the fan-shaped model adjustment parameter, to obtain a target three-dimensional vertex coordinate of each model vertex; and updating the target fan-shaped indicator based on the target three-dimensional vertex coordinate of each model vertex, and generating and displaying the updated target fan-shaped indicator.

In an embodiment, the adjusting the adjusted three-dimensional vertex coordinate of each model vertex in the target fan-shaped indicator based on the fan-shaped model adjustment parameter, to obtain the target three-dimensional vertex coordinate of each model vertex comprises:

replacing a target angle and/or a target radius of the adjusted three-dimensional vertex coordinate of each model vertex in the target fan-shaped indicator based on the angle adjustment parameter and/or the radius adjustment parameter, to obtain the target three-dimensional vertex coordinate of each model vertex.

In an embodiment, the performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator comprises:

mapping, by specifying an offset parameter value and adjusting a weight value, the first grayscale value of each model vertex of the fan-shaped indicator model from an initial threshold range into a target threshold range.

In an embodiment, the mapping, by specifying the offset parameter value and adjusting the weight value, the first grayscale value of each model vertex of the fan-shaped indicator model from the initial threshold range into the target threshold range comprises:

acquiring a difference value between the first grayscale value of each model vertex and the specified offset parameter value; and acquiring a product of the difference value of each model vertex and the adjusted weight value, and using the product of each model vertex as the fan angle control parameter of each model vertex.

In an embodiment, the converting the two-dimensional vertex coordinate of the model vertex into the three-dimensional vertex coordinate comprises:

determining, based on a position relationship between the fan-shaped indicator model and a preset coordinate system, a target coordinate axis in a vertical relationship with the fan-shaped indicator model in the preset coordinate system;

setting a coordinate value of each model vertex on the target coordinate axis to zero; and determining the three-dimensional vertex coordinate of each model vertex based on the two-dimensional vertex coordinate of each model vertex and the coordinate value.

In an embodiment, the adjusting the three-dimensional vertex coordinate based on the second grayscale value of each model vertex of the fan-shaped indicator model, to obtain the adjusted three-dimensional vertex coordinate comprises:

multiplying the second grayscale value of each model vertex by the corresponding three-dimensional vertex coordinate thereof, to obtain the adjusted three-dimensional vertex coordinate of each model vertex.

In an embodiment, the preset fan-shaped indicator model and the target fan-shaped indicator are each a grid model with a thickness parameter of zero.

The above embodiments may be referred to for specific implementations of the above operations, which will not be repeated here.

In some embodiments, as shown in FIG. 9, the computer device 300 further comprises: a touch screen 303, a radio frequency circuit 304, an audio circuit 305, an input unit 306, and a power supply 307. The processor 301 is electrically connected to the touch screen 303, the radio frequency circuit 304, the audio circuit 305, the input unit 306, and the power supply 307 respectively. Those skilled in the art can understand that the structure of the computer device shown in FIG. 4 does not constitute any limitation to the computer device, and may comprise more or fewer components than those shown in the figure, or may combine some components, or may have different component arrangements.

The touch screen 303 may be configured to display a graphical user interface and receive an operating instruction generated by a user acting on the graphical user interface. The touch screen 303 may comprise a display panel and a touch panel. The display panel may be configured to display information inputted by the user or information provided to the user, and various graphical user interfaces of the computer device. These graphical user interfaces may be composed of graphics, texts, icons, videos, and any combination thereof. In some embodiments, the display panel may be configured in the form of, e.g., a Liquid Crystal Display (LCD) or an Organic Light-Emitting Diode (OLED). The touch panel may be configured to collect a touch operation of the user thereon or in the vicinity thereof (such as an operation of the user on or in the vicinity of the touch panel using a finger, a touchpen, or any appropriate object or accessory), and generate a corresponding operating instruction, and the operating instruction executes a corresponding program. In some embodiments, the touch panel may comprise two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts it into contact point coordinates, then transmits the contact point coordinates to the processor 301, can receive a command transmitted from the processor 301, and can execute the command. The touch panel can cover the display panel. After detecting the touch operation on or in the vicinity of the touch panel, the touch panel transmits the touch operation to the processor 301 to determine a type of a touch event, and then the processor 301 provides a corresponding visual output on the display panel based on the type of the touch event. In an embodiment of the present disclosure, the touch panel and the display panel may be integrated into the touch screen 303 to implement input and output functions. However, in some embodiments, the touch panel and the touch panel may be used as two standalone components to implement the input and output functions. In some embodiments, the touch screen 303 may also be used as a part of the input unit 306 to implement the input function.

In an embodiment of the present disclosure, the processor 301 executes a game application program to generate the graphical user interface on the touch screen 303. The touch screen 303 is configured to present a graphical user interface and receive an operating instruction generated by a user acting on the graphical user interface.

The radio frequency circuit 304 may be configured to transmit/receive a radio frequency signal, so as to establish wireless communication with a network device or other computer devices through wireless communication, and transmit/receive signals to/from the network device or other computer devices.

The audio circuit 305 may be configured to provide an audio interface between the user and the computer device through a speaker or a microphone. The audio circuit 305 can transmit an electrical signal converted from received audio data to the speaker, which converts the electrical signal into an acoustical signal and outputs the acoustical signal. On the other hand, the microphone converts the collected acoustical signal into an electrical signal, which is received by the audio circuit 305, and then converted into audio data. Then, the audio data is outputted to the processor 301 for processing, and then transmitted to, for example, another computer device through the radio frequency circuit 304, or the audio data is outputted to the memory 302 for further processing. The audio circuitry 305 may further comprise an earphone jack, to provide communication between a peripheral earphone and the computer device.

The input unit 306 may be configured to receive an inputted number, character information, or user feature information (such as a fingerprint, an iris, or facial information), and generate keyboard, mouse, joystick, optical or trackball signal input related to user settings and function control.

The power supply 307 is configured to power various components of the computer device 300. In some embodiments, the power supply 307 may be logically connected to the processor 301 through a power management system, thereby managing functions such as charging, discharging, and power consumption management through the power management system. The power supply 307 may further comprise one or more than one DC or AC power supply, a recharging system, a power failure detection circuit, a power converter or inverter, a power status indicator, and any other components.

Although not shown in FIG. 9, the computer device 300 may further comprise, e.g., a camera, a sensor, a wireless fidelity module, and a Bluetooth module, which will not be repeated here.

In the above embodiments, particular emphasis is laid on description of each embodiment. Relevant descriptions of other embodiments may be referred to for parts that are not described in detail in an embodiment.

As can be seen from the above, the computer device provided in this embodiment acquires a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex; performs threshold adjustment on the first grayscale value of each model vertex of the fan-shaped indicator model, and uses the adjusted first grayscale value of each model vertex of the fan-shaped indicator model as a fan angle control parameter corresponding to a target fan-shaped indicator; generates a two-dimensional vertex coordinate of a model vertex corresponding to the target fan-shaped indicator based on the fan angle control parameter, and a target radius and a target angle determined by the target fan-shaped indicator; converts the two-dimensional vertex coordinate of the model vertex into a three-dimensional vertex coordinate; adjusts the three-dimensional vertex coordinate based on the second grayscale value of each model vertex of the fan-shaped indicator model, to obtain an adjusted three-dimensional vertex coordinate; and generates and displays the target fan-shaped indicator based on the adjusted three-dimensional vertex coordinate, the target angle, and the target radius. In the embodiments of the present disclosure, the three-dimensional vertex coordinate of each model vertex is constructed based on the preset fan-shaped indicator model, and the parameters such as the fan radius and the preset angle of the three-dimensional vertex coordinate can be changed, to dynamically adjust the target fan-shaped indicator corresponding to the preset fan-shaped indicator model, and obtain a fan-shaped indicator with the action range controllable in real time, thereby diversifying the manifestations of the fan-shaped indicator, simplifying the steps of modifying the indicator angle and the action range corresponding to the game indicator, and improving the fabrication efficiency of the game indicator.

Those of ordinary skills in the art can understand that all or a part of the steps in the methods of the above embodiments can be completed through instructions, or be completed by controlling related hardware through instructions, where the instructions may be stored in a computer-readable storage medium, and loaded and executed by a processor.

To this end, an embodiment of the present disclosure provides a computer-readable storage medium in which a plurality of computer programs are stored. The computer programs can be loaded by a processor to implement steps in any one method for generating a game indicator provided in the embodiments of the present disclosure. For example, the computer programs can implement the following steps:

acquiring a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;

performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator;

generating a two-dimensional vertex coordinate of a model vertex corresponding to the target fan-shaped indicator based on the fan angle control parameter, and a target radius and a target angle determined by the target fan-shaped indicator;

converting the two-dimensional vertex coordinate of the model vertex into a three-dimensional vertex coordinate;

adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius.

In an embodiment, before the generating the two-dimensional vertex coordinate of the model vertex corresponding to the target fan-shaped indicator based on the fan angle control parameter, and the target radius and the target angle determined by the target fan-shaped indicator, the implementation further comprises:

initializing a vertex coordinate corresponding to each model vertex among the plurality of model vertexes to set the vertex coordinate to zero.

In an embodiment, after the generating and displaying the target fan-shaped indicator based on the adjusted three-dimensional vertex coordinate, the target angle, and the target radius, the implementation further comprises:

acquiring, in response to an adjustment instruction for the target fan-shaped indicator, a fan-shaped model adjustment parameter, where the fan-shaped model adjustment parameter comprises an angle adjustment parameter and/or a radius adjustment parameter;

adjusting the adjusted three-dimensional vertex coordinate of each model vertex in the target fan-shaped indicator based on the fan-shaped model adjustment parameter, to obtain a target three-dimensional vertex coordinate of each model vertex; and updating the target fan-shaped indicator based on the target three-dimensional vertex coordinate of each model vertex, and generating and displaying the updated target fan-shaped indicator.

In an embodiment, the adjusting the adjusted three-dimensional vertex coordinate of each model vertex in the target fan-shaped indicator based on the fan-shaped model adjustment parameter, to obtain the target three-dimensional vertex coordinate of each model vertex comprises:

replacing a target angle and/or a target radius of the adjusted three-dimensional vertex coordinate of each model vertex in the target fan-shaped indicator based on the angle adjustment parameter and/or the radius adjustment parameter, to obtain the target three-dimensional vertex coordinate of each model vertex.

In an embodiment, the performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator comprises:

mapping, by specifying an offset parameter value and adjusting a weight value, the first grayscale value of each model vertex of the fan-shaped indicator model from an initial threshold range into a target threshold range.

In an embodiment, the mapping, by specifying the offset parameter value and adjusting the weight value, the first grayscale value of each model vertex of the fan-shaped indicator model from the initial threshold range into the target threshold range comprises:

acquiring a difference value between the first grayscale value of each model vertex and the specified offset parameter value; and acquiring a product of the difference value of each model vertex and the adjusted weight value, and using the product of each model vertex as the fan angle control parameter of each model vertex.

In an embodiment, the converting the two-dimensional vertex coordinate of the model vertex into the three-dimensional vertex coordinate comprises:

determining, based on a position relationship between the fan-shaped indicator model and a preset coordinate system, a target coordinate axis in a vertical relationship with the fan-shaped indicator model in the preset coordinate system;

setting a coordinate value of each model vertex on the target coordinate axis to zero; and determining the three-dimensional vertex coordinate of each model vertex based on the two-dimensional vertex coordinate of each model vertex and the coordinate value.

In an embodiment, the adjusting the three-dimensional vertex coordinate based on the second grayscale value of each model vertex of the fan-shaped indicator model, to obtain the adjusted three-dimensional vertex coordinate comprises:

multiplying the second grayscale value of each model vertex by the corresponding three-dimensional vertex coordinate thereof, to obtain the adjusted three-dimensional vertex coordinate of each model vertex.

In an embodiment, the preset fan-shaped indicator model and the target fan-shaped indicator are each a grid model with a thickness parameter of zero.

The above embodiments may be referred to for specific implementations of the above operations, which will not be repeated here.

The storage medium may comprise, e.g., a Read Only Memory (ROM), a Random Access Memory (RAM), a magnetic disk, or an optical disk.

The computer programs stored in the storage medium acquire a preset fan-shaped indicator model, where the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex; perform threshold adjustment on the first grayscale value of each model vertex of the fan-shaped indicator model, and use the adjusted first grayscale value of each model vertex of the fan-shaped indicator model as a fan angle control parameter corresponding to a target fan-shaped indicator; generate a two-dimensional vertex coordinate of a model vertex corresponding to the target fan-shaped indicator based on the fan angle control parameter, and a target radius and a target angle determined by the target fan-shaped indicator; convert the two-dimensional vertex coordinate of the model vertex into a three-dimensional vertex coordinate; adjust the three-dimensional vertex coordinate based on the second grayscale value of each model vertex of the fan-shaped indicator model, to obtain an adjusted three-dimensional vertex coordinate; and generate and display the target fan-shaped indicator based on the adjusted three-dimensional vertex coordinate, the target angle, and the target radius. In the embodiments of the present disclosure, the three-dimensional vertex coordinate of each model vertex is constructed based on the preset fan-shaped indicator model, and the parameters such as the fan radius and the preset angle of the three-dimensional vertex coordinate can be changed, to dynamically adjust the target fan-shaped indicator corresponding to the preset fan-shaped indicator model, and obtain a fan-shaped indicator with the action range controllable in real time, thereby diversifying the manifestations of the fan-shaped indicator, simplifying the steps of modifying the indicator angle and the action range corresponding to the game indicator, and improving the fabrication efficiency of the game indicator.

In the above embodiments, particular emphasis is laid on description of each embodiment. Relevant descriptions of other embodiments may be referred to for parts that are not described in detail in an embodiment.

A method for generating a game indicator, an apparatus for generating a game indicator, a computer device, and a storage medium provided in the embodiments of the present disclosure are introduced in detail above; the principles and implementations of the present disclosure are set forth herein with reference to specific examples, the description of the above embodiments is only used to help understanding the technical solutions and core concepts of the present disclosure; those with ordinary skills in the art should understand that: they can still make modifications on the technical solutions disclosed in the above embodiments, or perform equivalent replacements on a part of technical features thereof; and these modifications or replacements are not intended to make the essence of corresponding technical solutions depart from the scope of the technical solutions of the embodiments of the present disclosure.

The invention claimed is:

1. A method for generating a game indicator, comprising:

acquiring a preset fan-shaped indicator model, wherein the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;

performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator;

generating a two-dimensional vertex coordinate of a model vertex corresponding to the target fan-shaped indicator based on the fan angle control parameter, a target radius, and a target angle determined by the target fan-shaped indicator;

converting the two-dimensional vertex coordinate of the model vertex into a three-dimensional vertex coordinate;

adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius.

2. The method for generating a game indicator according to claim 1, wherein, before the generating the two-dimensional vertex coordinate of the model vertex corresponding to the target fan-shaped indicator based on the fan angle control parameter, and the target radius and the target angle determined by the target fan-shaped indicator, the method further comprises:

initializing a vertex coordinate corresponding to each model vertex among the plurality of model vertexes to set the vertex coordinate to zero.

3. The method for generating a game indicator according to claim 1, wherein, after the generating and displaying the target fan-shaped indicator based on the adjusted three-dimensional vertex coordinate, the target angle, and the target radius, the method further comprises:

acquiring, in response to an adjustment instruction for the target fan-shaped indicator, a fan-shaped model adjustment parameter, wherein the fan-shaped model adjustment parameter comprises at least one of an angle adjustment parameter or a radius adjustment parameter;

adjusting the adjusted three-dimensional vertex coordinate of each model vertex in the target fan-shaped indicator based on the fan-shaped model adjustment parameter, to obtain a target three-dimensional vertex coordinate of each model vertex; and updating the target fan-shaped indicator based on the target three-dimensional vertex coordinate of each model vertex, and generating and displaying the updated target fan-shaped indicator.

4. The method for generating a game indicator according to claim 3, wherein the adjusting the adjusted three-dimensional vertex coordinate of each model vertex in the target fan-shaped indicator based on the fan-shaped model adjustment parameter, to obtain the target three-dimensional vertex coordinate of each model vertex comprises:

replacing at least one of a target angle or a target radius of the adjusted three-dimensional vertex coordinate of each model vertex in the target fan-shaped indicator based on at least one of the angle adjustment parameter or the radius adjustment parameter, to obtain the target three-dimensional vertex coordinate of each model vertex.

5. The method for generating a game indicator according to claim 1, wherein performing threshold adjustment on the first grayscale value of each model vertex of the fan-shaped indicator model, and using the adjusted first grayscale value of each model vertex of the fan-shaped indicator model as the fan angle control parameter corresponding to the target fan-shaped indicator comprises:

mapping, by specifying an offset parameter value and adjusting a weight value, the first grayscale value of each model vertex of the fan-shaped indicator model from an initial threshold range into a target threshold range.

6. The method for generating a game indicator according to claim 5, wherein mapping, by specifying the offset parameter value and adjusting the weight value, the first grayscale value of each model vertex of the fan-shaped indicator model from the initial threshold range into the target threshold range comprises:

acquiring a difference value between the first grayscale value of each model vertex and the specified offset parameter value; and acquiring a product of the difference value of each model vertex and the adjusted weight value, and using the product of each model vertex as the fan angle control parameter of each model vertex.

7. The method for generating a game indicator according to claim 1, wherein converting the two-dimensional vertex coordinate of the model vertex into the three-dimensional vertex coordinate comprises:

determining, based on a position relationship between the fan-shaped indicator model and a preset coordinate system, a target coordinate axis that is perpendicular to the fan-shaped indicator model in the preset coordinate system;

setting a coordinate value of each model vertex on the target coordinate axis to zero; and determining the three-dimensional vertex coordinate of each model vertex based on the two-dimensional vertex coordinate of each model vertex and the coordinate value on the target coordinate axis.

8. The method for generating a game indicator according to claim 1, wherein adjusting the three-dimensional vertex coordinate based on the second grayscale value of each model vertex of the fan-shaped indicator model, to obtain the adjusted three-dimensional vertex coordinate comprises:

multiplying the second grayscale value of each model vertex by the corresponding three-dimensional vertex coordinate, to obtain the adjusted three-dimensional vertex coordinate of each model vertex.

9. The method for generating a game indicator according to claim 1, wherein the preset fan-shaped indicator model and the target fan-shaped indicator are each defined as a grid model with a thickness parameter of zero.

10. A system, comprising:

one or more memories collectively containing one or more programs; and one or more processors, wherein the one or more processors are configured to, individually or collectively, perform an operation comprising:

acquiring a preset fan-shaped indicator model, wherein the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;

performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator;

generating a two-dimensional vertex coordinate of a model vertex corresponding to the target fan-shaped indicator based on the fan angle control parameter, a target radius, and a target angle determined by the target fan-shaped indicator;

converting the two-dimensional vertex coordinate of the model vertex into a three-dimensional vertex coordinate;

adjusting the three-dimensional vertex coordinate based on the second grayscale value of each model vertex of the fan-shaped indicator model, to obtain an adjusted three-dimensional vertex coordinate; and generating and displaying the target fan-shaped indicator based on the adjusted three-dimensional vertex coordinate, the target angle, and the target radius.

11. The system according to claim 10, wherein, before generating the two-dimensional vertex coordinate of the model vertex corresponding to the target fan-shaped indicator based on the fan angle control parameter, and the target radius and the target angle determined by the target fan-shaped indicator, the operation further comprises:

initializing a vertex coordinate corresponding to each model vertex among the plurality of model vertexes to set the vertex coordinate to zero.

12. The system according to claim 10, wherein, after generating and displaying the target fan-shaped indicator based on the adjusted three-dimensional vertex coordinate, the target angle, and the target radius, the operation further comprises:
- acquiring, in response to an adjustment instruction for the target fan-shaped indicator, a fan-shaped model adjustment parameter, wherein the fan-shaped model adjustment parameter comprises at least one of an angle adjustment parameter or a radius adjustment parameter;
- adjusting the adjusted three-dimensional vertex coordinate of each model vertex in the target fan-shaped indicator based on the fan-shaped model adjustment parameter, to obtain a target three-dimensional vertex coordinate of each model vertex; and
- updating the target fan-shaped indicator based on the target three-dimensional vertex coordinate of each model vertex, and generating and displaying the updated target fan-shaped indicator.

13. The system according to claim 12, wherein adjusting the adjusted three-dimensional vertex coordinate of each model vertex in the target fan-shaped indicator based on the fan-shaped model adjustment parameter, to obtain the target three-dimensional vertex coordinate of each model vertex comprises:
- replacing at least one of a target angle or a target radius of the adjusted three-dimensional vertex coordinate of each model vertex in the target fan-shaped indicator based on at least one of the angle adjustment parameter or the radius adjustment parameter, to obtain the target three-dimensional vertex coordinate of each model vertex.

14. The system according to claim 10, wherein performing threshold adjustment on the first grayscale value of each model vertex of the fan-shaped indicator model, and using the adjusted first grayscale value of each model vertex of the fan-shaped indicator model as the fan angle control parameter corresponding to the target fan-shaped indicator comprises:
- mapping, by specifying an offset parameter value and adjusting a weight value, the first grayscale value of each model vertex of the fan-shaped indicator model from an initial threshold range into a target threshold range.

15. The system according to claim 14, wherein mapping, by specifying the offset parameter value and adjusting the weight value, the first grayscale value of each model vertex of the fan-shaped indicator model from the initial threshold range into the target threshold range comprises:
- acquiring a difference value between the first grayscale value of each model vertex and the specified offset parameter value; and
- acquiring a product of the difference value of each model vertex and the adjusted weight value, and using the product of each model vertex as the fan angle control parameter of each model vertex.

16. The system according to claim 10, wherein converting the two-dimensional vertex coordinate of the model vertex into the three-dimensional vertex coordinate comprises:
- determining, based on a position relationship between the fan-shaped indicator model and a preset coordinate system, a target coordinate axis that is perpendicular to the fan-shaped indicator model in the preset coordinate system;
- setting a coordinate value of each model vertex on the target coordinate axis to zero; and
- determining the three-dimensional vertex coordinate of each model vertex based on the two-dimensional vertex coordinate of each model vertex and the coordinate value on the target coordinate axis.

17. The system according to claim 10, wherein adjusting the three-dimensional vertex coordinate based on the second grayscale value of each model vertex of the fan-shaped indicator model, to obtain the adjusted three-dimensional vertex coordinate comprises:
- multiplying the second grayscale value of each model vertex by the corresponding three-dimensional vertex coordinate, to obtain the adjusted three-dimensional vertex coordinate of each model vertex.

18. The system according to claim 10, wherein the preset fan-shaped indicator model and the target fan-shaped indicator are each defined as a grid model with a thickness parameter of zero.

19. One or more non-transitory computer-readable storage media containing, in any combination, computer program code that, when executable by a computer system, perform an operation comprising:
- acquiring a preset fan-shaped indicator model, wherein the fan-shaped indicator model comprises a plurality of model vertexes, each of the model vertexes is provided with a corresponding VertexColor value, the VertexColor value comprises a first grayscale value and a second grayscale value, the first grayscale value is stored in a first color channel corresponding to the model vertex, and the second grayscale value is stored in a second color channel corresponding to the model vertex;
- performing threshold adjustment on the first grayscale value of each model vertex of the fan-shaped indicator model, and using the adjusted first grayscale value of each model vertex of the fan-shaped indicator model as a fan angle control parameter corresponding to a target fan-shaped indicator;
- generating a two-dimensional vertex coordinate of a model vertex corresponding to the target fan-shaped indicator based on the fan angle control parameter, a target radius, and a target angle determined by the target fan-shaped indicator:
- converting the two-dimensional vertex coordinate of the model vertex into a three-dimensional vertex coordinate;
- adjusting the three-dimensional vertex coordinate based on the second grayscale value of each model vertex of the fan-shaped indicator model, to obtain an adjusted three-dimensional vertex coordinate; and
- generating and displaying the target fan-shaped indicator based on the adjusted three-dimensional vertex coordinate, the target angle, and the target radius.

20. The one or more non-transitory computer-readable storage media of claim 19, wherein, before generating the two-dimensional vertex coordinate of the model vertex corresponding to the target fan-shaped indicator based on the fan angle control parameter, and the target radius and the target angle determined by the target fan-shaped indicator, the operation further comprises:
- initializing a vertex coordinate corresponding to each model vertex among the plurality of model vertexes to set the vertex coordinate to zero.

* * * * *